Figure 1:
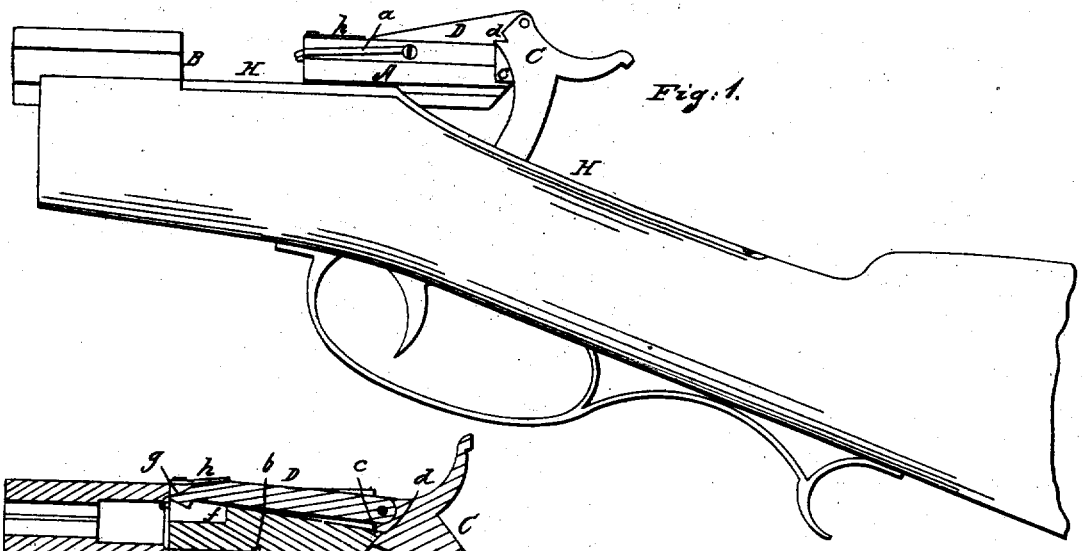

2 Sheets—Sheet 1.

J. D. S. NEWELL.

Breech Loading Fire Arm.

No. 3,680.

Reissued Oct. 19, 1869.

Witnesses:

Will Rogers.

H. H. Jenkins.

Inventor:

J. D. S. Newell

N. PETERS, Photo-Lithographer, Washington, D. C.

2 Sheets—Sheet 2.
J. D. S. NEWELL.
Breech Loading Fire Arm.
No. 3,680.
Reissued Oct. 19, 1869.
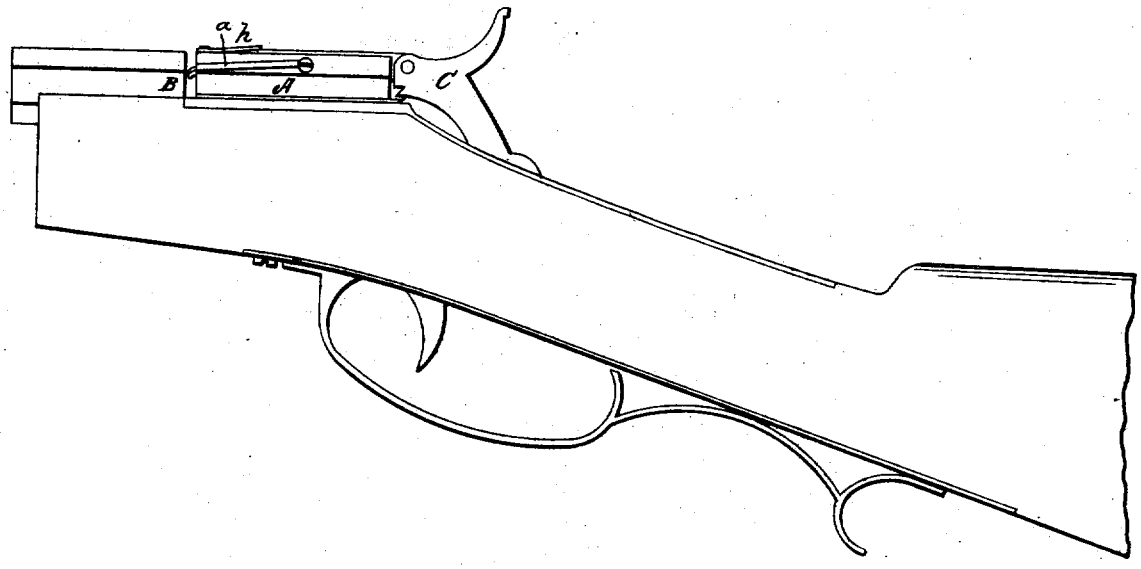
Witnesses:
Will Rogers.
H. N. Jenkins.
Inventor:
J. D. S. Newell.
N. PETERS, Photo-Lithographer, Washington, D. C.

United States Patent Office.

J. D. S. NEWELL, OF TENSAS PARISH, AND A. G. BRICE, E. TOMATIS, AND THOMAS PICKLES, OF NEW ORLEANS, LOUISIANA, ASSIGNEES OF J. D. S. NEWELL.

*Letters Patent No.* 88,730, *dated April* 6, 1869; *reissue No.* 3,680, *dated October* 19, 1869.

IMPROVEMENT IN BREECH-LOADING FIRE-ARMS.

The Schedule referred to in these Letters Patent and making part of the same.

*To all whom it may concern:*

Be it known that I, J. D. S. NEWELL, of the parish of Tensas, and State of Louisiana, have invented certain new and useful Improvements in Breech-Loading Guns; and I do hereby declare that the following is a full, clear, and exact description thereof, reference being had to the accompanying drawings, and to the letters of reference marked thereon, which form a part of this specification.

The primary and most important object or effect resulting from my invention, is a simplification of the mechanism required in breech-loading arms, by a reduction of the number of the parts thereof, and a consequent diminution of the cost of manufacturing such arms; but I also secure uniformity of diameter in the barrel and breech-piece, and therefore a more convenient and symmetrical form of gun.

To attain these desiderata, I provide a breech-piece which moves on slides in each side of it, instead of working through a fixed centre, and is drawn away from the rear end of the barrel, to admit the cartridge, by simply cocking the gun, and is then thrown back, through the agency of the main-spring, by the pulling of the trigger, and securely locked in the proper position to close the barrel, and effectually resist the shock of the explosion of the powder on the firing of the gun, an instant before the explosion takes place, through the agency of a needle-percussion against the fulminate-ring, or hollow flanch at the base of the cartridge-case.

My invention may be said, therefore, to consist of a novel arrangement of simple mechanical parts, which, in their separate form, and combined relation and action, will be at once clearly understood by referring to the drawings.

At Figure 1 is exhibited an external view of a single-barrel gun, to which my invention has been applied.

In this view the gun is cocked, and ready to be fired, so soon as a cartridge has been inserted in the barrel, which cartridge is designed, in all cases, to be contained in a metallic case, provided with a concentric hollow flanch at the rear end, or base thereof, for the reception of the fulminate, to ignite the powder and discharge the gun.

It will be observed that there is abundant space between the front end of the breech-piece A and the rear end, B, of the barrel, to allow of the easy and rapid introduction of a cartridge within the latter.

Two cartridge-withdrawing spring-hooks, *a*, are secured in longitudinal grooves, or recesses, that are cut or sunk in the breech-piece, in order to preserve a smooth outside surface on the same, in such manner that they project a little beyond the front end of the breech-piece, as shown.

These hooks enter shallow notches in the rear end of the barrel, and taking over the flanch of the cartridge-case, whenever the breech-piece impinges against the rear end of the barrel, withdraw the said case, with or without the ball and powder, accordingly as the gun has or has not been fired, as the breech-piece is drawn back from the barrel by the operation of cocking the gun.

In order to insure the expulsion of the empty cartridge-case, after it is drawn out of the barrel by the hooks *a*, from the open space between the breech-piece and the barrel, a small projecting pin, or knob, *b*, is fixed in the plate H, on which the breech-piece slides, at a point sufficiently removed from the end of the barrel to bring the front end of the cartridge-case out of the same, or about at the point shown on the drawing.

This knob *b* strikes against the flanch of the cartridge-case, as the latter is being drawn back by the hooks *a*, and tilting the same in an upward direction, in a sudden manner, throws it out of connection with the hooks, and out of the open space, with unvarying certainty.

The knob *b* fits in a longitudinal groove, extending from one end to the other, of the breech-piece, and hence affords an additional means to the side-slides, which, I may here remark, may be of any ordinary construction, for keeping the said breech-piece in proper position, in its reciprocating movements, to open and close the rear end of the barrel.

The breech-piece A is provided with a rear-projecting part, *c*, for a purpose hereafter described.

Figure 2:
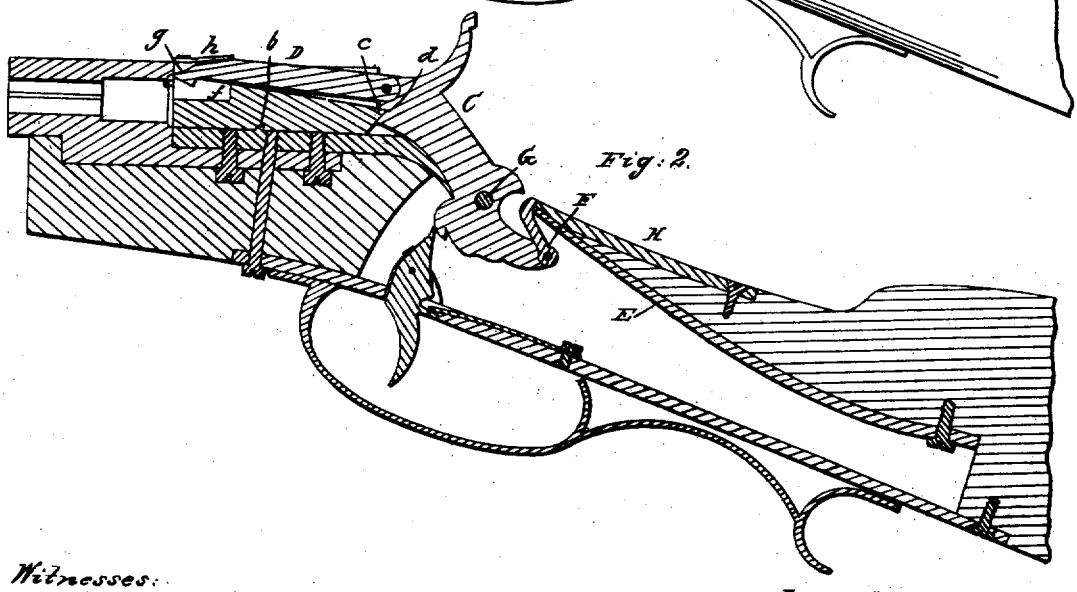

At Figure 2, a longitudinal sectional view is shown, of a gun, to which my invention has been applied, and it will be seen, from an inspection of this figure, that the hammer C has a triangular transverse cleft, or notch, *d*, across its upper front end, near the bottom thereof, that exactly corresponds, in size and form, with the back extremity of the projecting part *c* of the breech-piece, and that a peculiarly-formed bar, D, is pivoted to the same end of the hammer, just above the cleft *d*.

This bar D works in a groove, or narrow recess in the breech-piece A, and its length is just sufficient to insure as light projection of its sharp-pointed front extremity beyond the front end of the breech-piece, whenever force enough is applied to drive it under the spring *h*, which always happens when the breech-piece is thrown against the barrel, as in the act of firing the gun, by the action or tensile force of the main-spring E of the lock.

The violent projection of the needle-point of the bar D against the fulminate-ring, flanch, or other containing part of the cartridge-case, for the igniting-fulminate, is, in fact, my means for discharging the arm.

For about one-third the distance from the front end of the breech-piece, toward the rear end thereof, the longitudinal recess in which the bar D works, is about twice as deep as it is back of that point, the change of the depth being abrupt, so as to provide a perpendicular face, *f*, within said recess, for a purpose presently disclosed.

The needle-bar D, if I may so call it, is provided with a catch, or hook, *g*, near its pointed extremity, and on its under side, which, in the backward movement of the hammer C, in the operation of cocking the gun, takes against the perpendicular face *f*, and thus draws back the breech-piece A, and opens the rear end of the barrel, for the introduction of a new cartridge after each discharge of the gun.

This bar D is held in its place by the cap-spring *h*, attached, as shown, at the front end of the breech-piece, and on the top thereof.

The inclined notch *i*, on the upper edge of the needle-bar D, abutting against the rear edge of the spring *h*, prevents the protrusion of the pointed extremity of the said bar beyond the end of the breech-piece, except when the tensile force of the spring E, combined with the momentum of the hammer and breech-piece, is brought into play in the act of firing the gun. In this case, the force is sufficient to drive the bar D underneath the spring *h*, past the notch *i*, the inclination of the same making the operation certain and easy, and the spring hold down the bar firmly in its place.

The same results, from the action of the needle-bar, may be obtained by having it pivoted to the top of the breech-block at the same point, instead of being loose and working under the spring.

It will thus be seen that the needle-bar D, being pivoted to the hammer C, through the instrumentality of the hook *g*, on its lower edge, in connection with the vertical part *f* of the recess in which it works, constitutes the means of opening the rear end of the barrel, by the simple operation of drawing back the said hammer in cocking the gun, and that, hence, the hammer is the only external lever, or part that needs to be manipulated in the actual practice or use of my invention.

The hammer C is actuated by a main-spring, E, which is connected to it by means of the link F. But there being no novelty in this spring, nor in its mode of operation, no particular description of it is necessary.

Nor is there anything about the trigger that is new. It may be adjusted to its place, and with relation to notches in the tumbler-foot of the hammer, to maintain the latter at cock and half cock, in any usual manner that is applicable to similar gun and pistol-locks.

The hammer C articulates, in its vibration, on a pin, G, which, insomuch as it sustains, or must withstand the force of the shock that is incident to the discharge of the gun, should be made of steel finely tempered, in order to possess the requisite strength.

The pin G has its bearings in a removable plate, H, which may be attached either to a wooden or metallic stock, at the pleasure of the constructor.

The triangular rear extension, *c*, of the breech-piece, fits into the correspondingly-formed notch *d* of the hammer, whenever the breech-piece occupies the position shown at fig. 2, which it must do whenever the gun is fired, and thus effectually prevents the recoil of the breech-piece, and the opening of the rear end of the barrel by the firing of the arm, for it will be seen that from the formation of that part of the rearward extension *c*, on which falls all the recoil-pressure, the whole force of such pressure is directed in a downward direction, and that consequently the hammer cannot vibrate backward, nor the breech-piece yield, unless the pin G be broken by the shock. In fact, the breech-piece is locked, or held up against the rear end of the barrel, by this arrangement, by the very force of the recoil-tendency, and hence the singular, if not anomalous fact follows, that precisely in proportion to the force exerted to produce a recoil, or back movement of the breech-piece, is the tenacity of its hold upon its position against the rear end of the barrel. Nor is this the only function that is fulfilled by the rear extension *c* of the breech-piece, for, by bringing the hammer down upon it, as shown at Figure 3, plate 2, the breech-piece is locked between the position of half cock and that of absolute contact with the rear end of the barrel, so securely and firmly, that no blow nor concussion on the hammer or gun, in the direction of the muzzle of the gun, can unlock it, no matter how severe the same may be, whilst at the same time the gun may be cocked and fired with the same ease as when at half cock, or the breech is in direct contact with the rear end of the barrel.

This is an exceedingly meritorious characteristic of my invention, for it secures absolute safety against an accidental discharge of the gun to which it is attached, from any cause whatsoever.

My invention may be used in connection with double, as well as single-barrel guns and pistols, and with shot equally as with ball-cartridge, but in all and every case, metallic cartridges must be used.

Its points of merit are, simplicity, cheapness of construction, and effectiveness in practice. It can be fired with nearly the same rapidity as the cumbrous magazine-guns of Henry, Spencer, Winchester, and others, whilst it is far lighter, and more symmetrically proportioned in all its parts. The mode of its operation has been made manifest in describing it.

Having thus fully described my invention,

What I claim, and desire to secure by Letters Patent, is—

1. The combination of the slotted or hooked link *c*, and hammer or lever B, when said lever is located in a plane centrally with the axis of the bore of the barrel, whereby the reciprocating breech-closer is operated both ways, as herein described.

2. The centrally-located hammer or lever B, in combination with the reciprocating breech-closer, for the purpose of locking said closer against the recoil or force of the explosion, as set forth.

3. The combination of the main-spring, central vibrating hammer, and breech-closer, whereby the breech is closed and locked, and the charge ignited at the one operation of pulling the trigger, as specified.

4. The combination of the mechanism herein described, whereby the cartridge or case is withdrawn and expelled, the breech opened, and piece cocked, as set forth.

In testimony that I claim the foregoing as my own, I affix my signature, in presence of two witnesses.

J. D. S. NEWELL.

Witnesses:

T. H. ALEXANDER,

EDM. F. BROWN.